United States Patent [19]

Nakamura

[11] Patent Number: 5,044,721
[45] Date of Patent: Sep. 3, 1991

[54] HOLDER FOR OPTICAL FIBER END-PROCESSING DEVICE

[75] Inventor: Kunio Nakamura, Tokyo, Japan

[73] Assignee: AMP Incorporated, Harrisburg, Pa.

[21] Appl. No.: 510,757

[22] Filed: Apr. 18, 1990

[30] Foreign Application Priority Data

Apr. 18, 1989 [JP] Japan .................. 1-97798

[51] Int. Cl.⁵ .................. G02B 6/36; G02B 7/26
[52] U.S. Cl. .................. 385/53; 350/96.21
[58] Field of Search .................. 350/96.20, 96.21

[56] References Cited

U.S. PATENT DOCUMENTS

| | | | |
|---|---|---|---|
| 4,695,126 | 9/1987 | Cook .................. | 350/96.21 |
| 4,772,081 | 9/1988 | Borgos et al. .................. | 350/96.21 |
| 4,798,431 | 1/1989 | Clark et al. .................. | 350/96.21 |
| 4,953,941 | 9/1990 | Takahashi .................. | 350/96.21 |
| 4,953,944 | 9/1990 | Moulin .................. | 350/96.21 |

Primary Examiner—William L. Sikes
Assistant Examiner—Robert E. Wise
Attorney, Agent, or Firm—Allan B. Osborne; Adrian J. LaRue

[57] ABSTRACT

An end-processing device for an optical fiber (42) comprises a housing (3, 4) having a receiving recess (10) extending from a front wall (23) to the other end, an aperture (14) located in the front wall (23), a heat conductive plate member (15) mounted on a front surface of the housing (3), pushing means (17, 22) mounted on the optical fiber (42) and in the receiving recess (10) for pushing the optical fiber end toward the heat conductive plate member (15), a reference surface (16) at the front wall (23) to regulate the final movement of the optical fiber (42), the plate member (15) being selectively coupled to a heating means (30) for processing the end of the optical fiber.

8 Claims, 3 Drawing Sheets

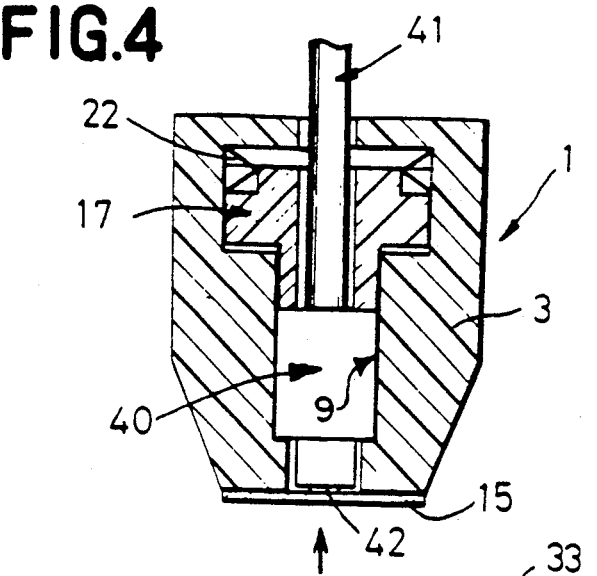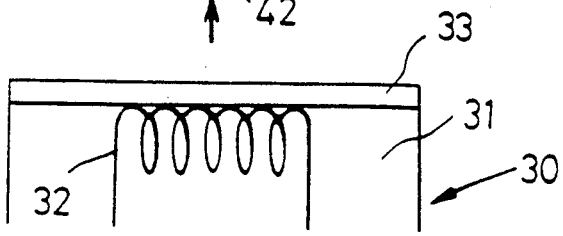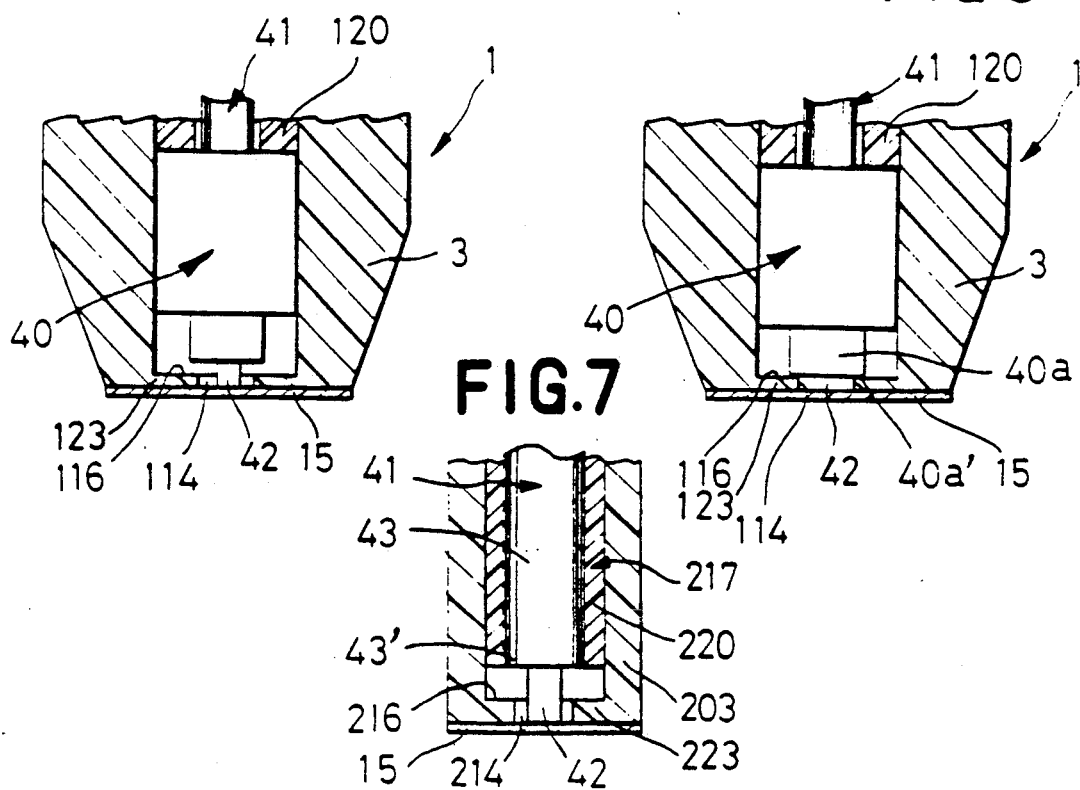

HOLDER FOR OPTICAL FIBER END-PROCESSING DEVICE

FIELD OF THE INVENTION

This invention relates to a holder for an optical fiber end-processing device, more specifically to a holder to process an end surface of an optical fiber into a flat and smooth surface by holding an end of the optical fiber which is pushed against a metal plate, heating the end surface by a heating device to soften the end of the optical fiber, and removing the holder from such heating device to cool and harden the softened end surface of the optical fiber to obtain a flat and smooth surface.

BACKGROUND OF THE INVENTION

A currently available optical fiber comprises a core and a clad of circular configuration in cross section. Typically, the core and clad of the optical fiber are made from polymethyl methacrylate and fluoresin.

In such optical fiber for optical transmission applications, it is essential that no optical loss of the transmitted light exists at the end surface by random reflections.

In this regard, smooth-finishing technology of an end surface of such optical fiber is disclosed in Japanese Patent publication No. 15241/85.

The technology is to press the end of an optical fiber against a heating plate having a flat and smooth surface to soften such end thereafter being cooled and hardened to finish it into a smooth surface.

A problem of such prior art technology is, however, the difficulty of holding the end of the optical fiber vertically or at a right angle on the surface of the heating plate so as to control the amount of softening of the optical fiber in its axial direction, thereby making it difficult to obtain an optical fiber of stabilized end quality and to increase productivity of workability. The reason is that it is difficult for an operator to support the front end of the optical fiber in an annular section of a support member standing up-right for urging the end of the optical fiber on the heating plate.

It is an object of this invention to provide a holder capable of controlling the end of the optical fiber in an up-right position or at a right angle with respect to its axis and to control the amount of softening of the optical fiber.

SUMMARY OF THE INVENTION

In order to solve the above problems, the present invention has a pushing member accommodated in a receiving recess of a holder in such a manner to move toward the front wall of the receiving recess under the action of a spring. An aperture is formed in the front wall in communication with the receiving recess. A metal plate having a smooth inner surface is mounted on the outer surface of the front wall so as to close the aperture. The plate has characteristics to be easily heated when it is pressed against a heating plate of a heating device but cooled down when it is separated from the heating plate. In a case where an optical connector attached near the front end of an optical fiber is received in the receiving recess between the front end surface of the pushing member and the front wall, the connector is pushed toward the front end by the pushing member and the end of the optical fiber having its jacket stripped and extending from the end surface of the connector is pressed against the smooth inner surface of the plate by way of the aperture. A reference surface is provided in the receiving recess near the plate to stop forward movement of the connector.

In the preferred embodiment, the inner surface of the front wall is utilized as the reference surface.

The holder of the above construction is limited to such applications to process the end of an optical fiber having an optical connector. However, in other applications excluding such connector, the optical fiber is held in such a manner that the end of the optical fiber having its jacket stripped extends through the front end of the pushing member and is secured to the pushing member. When held in such manner, the optical fiber is pressed toward the front wall by the pushing member and the end of the optical fiber touches with certain pressure the smooth inner surface of the plate by way of the aperture. A reference surface is provided in the receiving recess in such a manner that the front end of the jacket for the optical fiber abuts against the inner surface of the front wall in the receiving recess near the plate and stops the forward movement of the pushing member. The two embodiments are identical in other constructions.

As described hereinbefore, the metal plate is thermally coupled to the heating plate of the heating device while the optical fiber is held in the holder and the end of the optical fiber is pressed onto the plate. Heat is then conducted from the heating device to the plate so as to soften the end of the optical fiber by the heated plate. Simultaneously, as the softening progresses in the above first embodiment, the connector moves forward until a surface abuts against the reference surface or the inner surface of the front wall. However, in the above second embodiment, the optical fiber moves forward as the softening progresses until the front end of the jacket abuts against the inner surface of the front wall. Such restriction in the forward movement of the optical fiber regulates the amount of softening of the optical fiber. When the plate is removed from the heating device, the plate is naturally cooled to harden the softened end of the optical fiber.

BRIEF DESCRIPTION OF THE DRAWING

Embodiments of the present invention will be described in detail hereunder by way of example with reference to the accompanying drawings.

FIG. 4 is a cross-sectional view of the holder showing the plate removed from the heating plate of the heating device.

FIG. 5 is a cross-sectional view of the holder according to another embodiment of the invention having a similar connector as the above.

FIG. 6 is a cross-sectional view showing the processed optical fiber end by moving the connector and the optical fiber in the holder of FIG. 5.

FIG. 7 is a cross-sectional view of a front section of a still further embodiment of the holder to process an optical fiber having no connector.

DETAILED DESCRIPTION OF THE INVENTION

Figure 1:
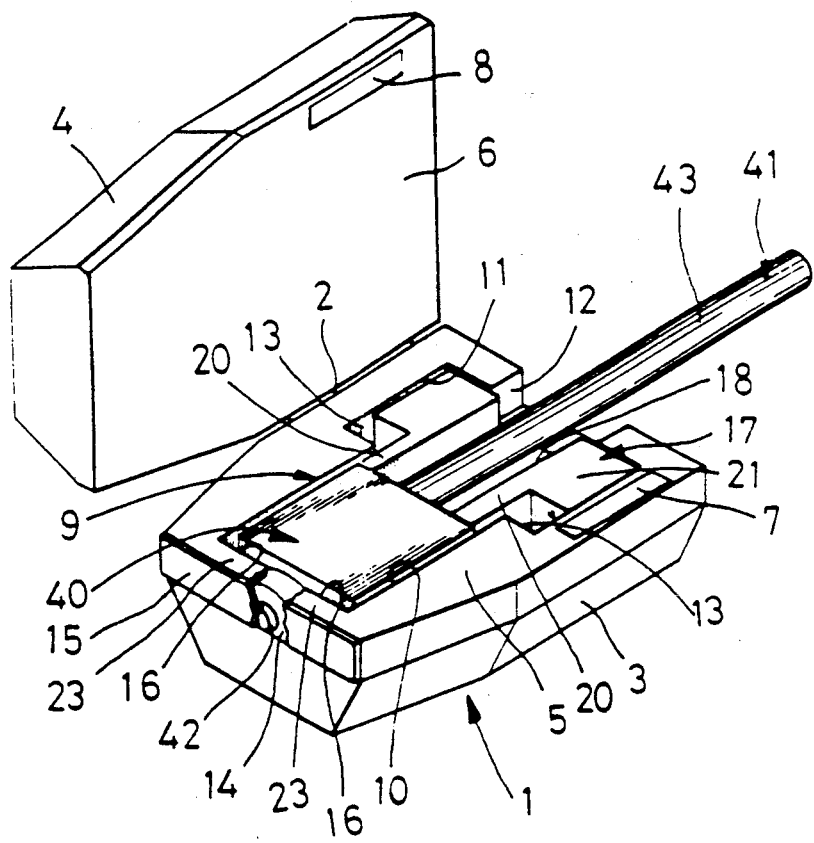
FIG. 1 is a perspective view of the holder according to the present invention to illustrate the inside of such holder and also an optical fiber cable having a connector mounted thereto.

FIG. 1 shows a holder 1 according to the present invention. The holder 1 is made from a heat-resistant material such as metal, plastic, or the like and contains a receiving member 3 and a cover member intercoupled by a hinge section 2. The receiving member 3 and the cover member 4 are held in a closed position by permanent magnet bars 7, 8 buried in their contacting surfaces 5, 6. The receiving member 3 has a receiving recess 9 therein. The receiving recess 9 comprises a first section 10, a second section 11 and a third section 12 open at its outer end. An aperture or opening 14 is formed at the center portion in the front wall 23 of the first section 10. The opening 14 is closed by a plate 15 mounted on the outer surface of the front wall 23. The plate 15 is made from a highly heat conductive metal or other suitable material. The inner surface is formed as a so-called mirror surface or a high degree of flat surface.

Slidably accommodated in the second section 11 of the receiving recess 9 is a pushing member 17 made from metal, plastic or other suitable material. The pushing member 17 comprises a central recess 18 extending therethrough, a pushing section 20 extending forwardly and a flange 21 extending to both sides. A part of the pushing section 20 is held in a part of the receiving recess 9. A spring 22 (see FIG. 2) is positioned between the rear surface of the flange 21 and the back wall of the receiving member 3. In this way, the pushing member 17 is always biased in the forward direction.

Figure 2:
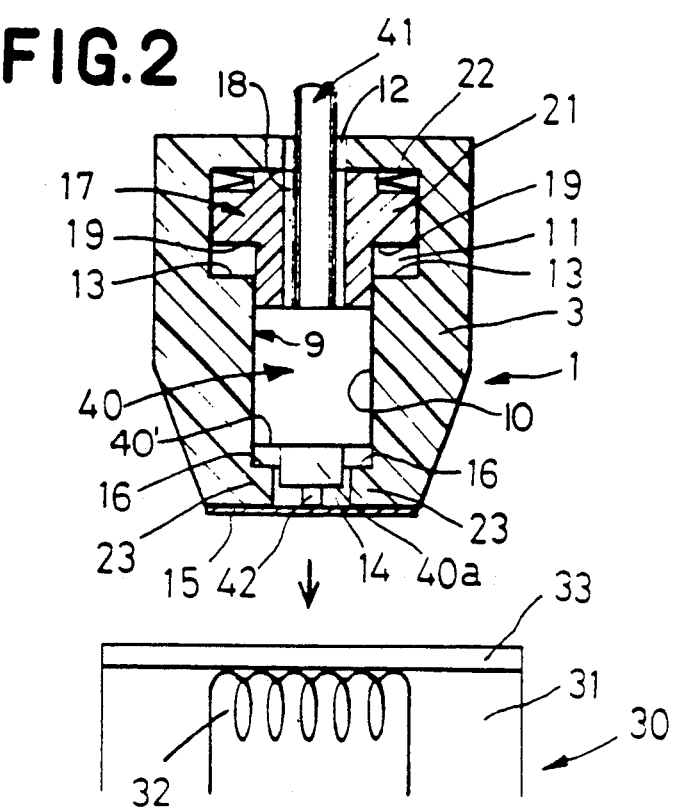
FIG. 2 is a cross-sectional view of the holder and a simplified view of a heating device.

As shown in FIGS. 1 and 2, the holder 1 as constructed above slidably receives the optical connector 40 in the first section 10 of the receiving recess 9 when processing the end of the optical fiber 42 having the connector 40 mounted near the front end of the cable 41. In this condition, the pushing member 17 forwardly biased by the expanding spring 22 pushes the connector 40 in the forward direction. A front extended section 40a of the connector 40 is in alignment with the aperture 14 in the front wall 23. The end of the optical fiber 42 with jacket 43 stripped from the fiber cable 41 is resiliently pressed against the inner surface of the plate 15. The cable 41 extends backwardly through the third section 12 open at the rear end of the receiving recess 9 by way of the recess 18 in the pushing member 17. The optical fiber 42 is constructed to have a circular cross section and comprises a core member made, for example, from polymethyl acrylate and a clad member of fluoresin having a lower light refractive index than the core member. Of course, the invention is not restricted to such construction. After setting the connector 40 and the cable 41 in the receiving member 3, the cover member 4 is closed so as to maintain them in a closed position by the permanent magnet bars 7, 8.

Figure 3:
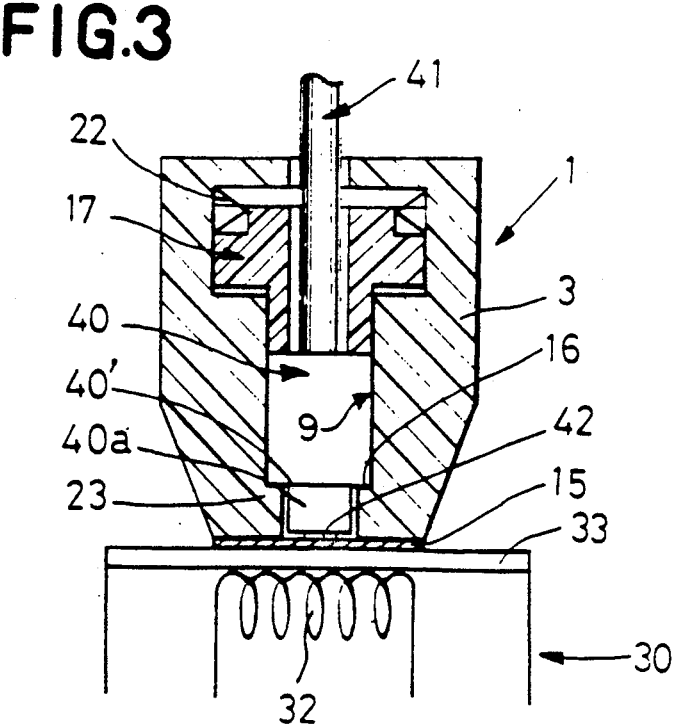
FIG. 3 is a cross-sectional view of the holder and a metal plate contacting the heating plate of the heating device with the connector and the optical fiber being moved for end processing of the optical fiber.

Consequently, the plate 15 of the holder 1 is brought into thermal contact with the heating plate 33 of the heating device 30 which is heated by electrical heating coil 32 disposed in the housing 31 as shown in FIG. 3. The heating plate 33 is heated to a sufficient temperature to soften the resin from which the optical fiber is made. The heat of the heating plate 33 is then conducted to the plate 15 to soften the end of the optical fiber 42 contacting the inner surface of the plate 15. The cable 41 is then driven forward or downwardly along with the connector 40 as the softening progresses until the shoulder or surface 40' of the connector 40 abuts against the inner surface 16 of the front wall of the holder 1 acting as the reference plane. In FIG. 3, when the shoulder 40' of the connector 40 abuts against the surface 16 of the holder 1, the front end of the section 40a of the connector 40 is isolated from the inner surface of the plate 15. It may however be close or barely in contact with the inner surface.

As shown in FIG. 4, subsequent to the above processing, the holder 1 may be removed away from the heating device 30 to such location or direction that the plate 15 is not susceptible to any thermal influence of the heating plate 33. The cover member 4 of the holder 1 is opened to remove the connector 40 and the cable 41 out of the holder. During this time period, the temperature of the heated plate 15 cools to a sufficient temperature to harden the softened end of the optical fiber 42. The end of the hardened optical fiber 42 is finished into a high degree of smooth surface or mirror surface with enlarged diameter. It is to be noted that the plate 15 acts not only to cool the end surface of the softened optical fiber 42 but also to protect the end until it is fully cooled and hardened. Additionally, since the pushing member 17 is biased by the spring 22, the pushing force on the connector 40 by the pushing member 17 decreases gradually as the end of the connector 40 approaches surface 16. As a result, the amount and speed of movement of the optical fiber 42 are initially large to conduct more heat to the end of the optical fiber. However, less heat is conducted to the end of the optical fiber at the final stage of the optical fiber end processing. If more heat than necessary is conducted to the fiber end, even at the final stage of the end processing, an adverse effect occurs in the fiber quality as understood from the above discussion. The embodiment of this invention effectively avoids such adverse effect.

Illustrated in FIGS. 5 and 6 is the receiving member 3 of the holder 1 according to another embodiment of this invention. The holder 1 of this embodiment is implemented in such a manner that the front end of the extended section 40a of the connector 40 abuts against the inner surface 116 of the front wall 123 around the aperture 114, surface 116 acting also as a reference place. As understood from FIG. 6, this spreads the resin of the softened optical fiber 42 in the space defined by the front end of the extended section 40a of the connector 40, the circumferential surface of the aperture 114 and the inner wall of the plate 15. In this manner, the end of the optical fiber 42 is formed in the particular shape of the space and then cooled and hardened as a flange on the front end surface of the extended section 40a of the connector 40. Accordingly, the depth and shape of the aperture 114 or the thickness of the front wall 123 in which the aperture is positioned are chosen in accordance with the intended configuration of the end of the optical fiber 42.

An extension of the above technology leads to a holder capable of processing the end of the optical fiber 42 of the cable 41 having no connector 40 mounted thereon. For example, as shown in FIG. 7, the pushing section 220 of the pushing member 217 corresponding to the pushing section 20 of the pushing member 17 extends to near the front end of the cable 41 to hold the jacket 43 and not deform the optical fiber 42. The receiving member 203 is implemented in such a manner that the front end 43' of the cable with the jacket 43 stripped abuts against the inner surface 216 of the front wall 223. Accordingly, the resin at the softened end of the optical fiber 42 spreads into the space defined by the front end 43' of the jacket 43, the circumference of the aperture 214 and the inner surface of the plate 15, thereby cooling and hardening the optical fiber 42 at the front end 43' of the jacket 43 and forming the end of optical fiber 42 as a flange in such space. In practice, the cable end needing to be processed in this shape, such processing can be performed most efficiently by simply using such holder.

In order to hold the cable 41 so as not to slidably move with respect to the section 220, many conventional means are available including the provision of a clamp to fasten the cable 41 at the cable-receiving recess in the section 220 or interference fitting the cable 41 within the recess of the pushing member 217.

Although not shown in the drawings, the holder 1 may be constructed to hold a plurality of optical fiber cables with or without connectors in parallel so that the ends of the optical fibers may be processed simultaneously.

According to the present invention, the end of an optical fiber cable can be held precisely up-right or in a vertical position with respect to the inner surface of a cooling plate. The optical fiber end can be softened under this condition by pressing the metal plate against a heating plate of a heating device. The movement of the optical fiber within the holder is restricted by a reference plane in the holder to control the amount of the optical fiber end to be softened. Accordingly, the present invention provides an optical fiber having a high-quality end surface.

I claim:

1. An end-processing device for an optical fiber characterized in that;

a housing having a receiving recess extending from a front wall to the other end for removably inserting at least one optical fiber, said front wall having an aperture;

a heat conductive plate member having a flat inner surface mounted at a predetermined angle on a front surface of said front wall of said housing in alignment with the aperture;

pushing means in the receiving recess of said housing for pushing the end of the optical fiber toward said inner surface of said plate member; and a surface at said front wall in said receiving recess of said housing against which said pushing means engages thereby stopping movement of the optical fiber;

wherein said plate member is selectively coupled to a heating means for processing the end of the optical fiber.

2. An end-processing device as claimed in claim 1, characterized in that said pushing means comprises a pushing member mounted to the optical fiber and spring means between the housing and the pushing member.

3. An end-processing device as claimed in claim 1, characterized in that an optical connector is mounted on the optical fiber and has a body section and front section.

4. An end-processing device as claimed in claim 3, characterized in that said body section engages said reference surface.

5. An end-processing device as claimed in claim 3, characterized in that said front section engages said reference surface.

6. An end-processing method for an optical fiber characterized by the steps of:

stripping an optical fiber cable to expose an optical fiber to be processed by a desired length;

holding the optical fiber at a desired angle with respect to a heat conductive plate member having a flat inner surface;

heating the end of the stripped optical fiber contacting the inner surface by selectively coupling said plate member to heating means;

pushing the optical fiber toward said plate member;

stopping the movement of the optical fiber at a predetermined position; and cooling said plate member by disconnecting the plate member from said heating means.

7. An end-processing method as claimed in claim 6, characterized by the additional step of forming the end of the optical fiber into a flange.

8. An end-processing device as claimed in claim 1, characterized in that said pushing means comprises a pushing member, an optical connector mounted on the optical fiber, and spring means between the housing and the pushing member.

* * * * *